Patented May 19, 1925.

1,538,326

UNITED STATES PATENT OFFICE.

EDWARD A. HINES, OF SAN FRANCISCO, CALIFORNIA.

PROCESS OF MAKING A FRUIT-CAKE COMPOSITION.

No Drawing. Application filed May 5, 1924. Serial No. 711,062.

*To all whom it may concern:*

Be it known that I, EDWARD A. HINES, a citizen of the United States, residing at San Francisco, in the county of San Francisco and State of California, have invented new and useful Improvements in Processes of Making a Fruit-Cake Composition, of which the following is a specification.

The object of my invention is to provide a fruit cake and a composition for producing the same of fine texture in which the flavoring of the fruit and spices will be evenly distributed throughout the resulting product.

My composition or formula for producing the best results comprises the following proportionate ingredients:

Nineteen pounds of flour, sixteen pounds of sugar, six pounds of lard, six ounces of cinnamon, one and one-half ounces of allspice, one-half ounce of cloves, two ounces of mace, one-quarter ounce of ginger, three ounces of salt, four ounces of soda, five ounces of baking powder and twenty pounds of raisins together with two gallons of water. Nuts and citron may be added if desired; if nuts are added about two pounds should be used and if citron is added a proportionate amount should be used.

In preparing the cake batter the above ingredients are mixed in the following manner:

The cinnamon, allspice, cloves, mace, ginger, salt, raisins and sugar are thoroughly mixed together with two gallons of water to form a soft paste. This paste is cooked or boiled for five minutes then removed from the stove and the six pounds of lard added and allowed to melt; the soda, baking powder and flour are sifted into the hot paste and stirred well to form a batter and this batter is then placed in tins or other receptacles for baking.

By mixing the spices and fruits with water and cooking them, the essential oils of the spices are released and they are then in condition not only to unite more easily with other ingredients but they will be capable of penetrating evenly throughout the composition. The boiling of the fruits softens them and reduces them to a somewhat pulpy condition with their flavoring constituents reduced to such form that they are capable of combining with the other ingredients and may become easily and thoroughly incorporated therewith. The resulting hot, pasty mass of thoroughly blended fruit and spices is then in the proper condition for the addition of the lard and, after the melting of the lard, for the addition and blending therewith of the baking powder, soda and flour. The composition is of fine and even texture with all the ingredients evenly distributed throughout the same, so that the flavoring properties will penetrate and be held in every portion thereof.

This formula produces a most desirable fruit cake when properly baked and if the nuts and proportionate amount of citron are used the richness and flavor of the cake will be greatly improved.

The herein mentioned ingredients may be varied slightly as to proportion if desired, but it has been demonstrated by practice that the proportions given should be adhered to as nearly as possible to obtain the best results.

I claim:

1. The process of making a fruit cake composition which comprises the steps of mixing spices and fruits with water to form a soft paste and boiling the same, adding lard to the mixture while it is hot, and incorporating therewith flour and baking powder and soda after the lard has melted.

2. The process of making a fruit cake consisting in mixing sixteen pounds of sugar, twenty pounds of raisins and three-quarters of a pound of spices with two gallons of water and cooking the same to form a soft paste, adding six pounds of lard thereto and allowing it to melt, adding nineteen pounds of flour, four ounces of soda and five ounces of baking powder and thoroughly mixing the mass, and baking the same.

EDWARD A. HINES.